United States Patent [19]
Edwards

[11] Patent Number: 4,977,986
[45] Date of Patent: Dec. 18, 1990

[54] BONDING FRICTION MATERIAL TO PLATED SUBSTRATES

[75] Inventor: Keith R. Edwards, Lindsay, Canada

[73] Assignee: Abex Corporation, Newton, Mass.

[21] Appl. No.: 461,616

[22] Filed: Jan. 8, 1990

Related U.S. Application Data

[62] Division of Ser. No. 348,045, May 5, 1989.

[51] Int. Cl.$^5$ ............................................. F16D 69/04
[52] U.S. Cl. ................................. 188/73.1; 188/250 B
[58] Field of Search ............ 29/233; 188/73.1, 250 B, 188/250 E, 250 G, 251 A, 251 M, 251 R, 218 R

[56] References Cited

U.S. PATENT DOCUMENTS 3,891,398 6/1975 Odier ............................. 188/73.1 X

FOREIGN PATENT DOCUMENTS 235473 6/1925 United Kingdom ........... 188/251 M
677144 8/1952 United Kingdom ............ 188/218 R
2190968 12/1987 United Kingdom ............... 188/73.1

Primary Examiner—Duane A. Reger
Attorney, Agent, or Firm—Thomas S. Baker, Jr.

[57] ABSTRACT

A brake shoe or pad in which the back plate is zinc plated and a friction material preform is bonded directly to the zinc plated surface.

4 Claims, 2 Drawing Sheets

BONDING FRICTION MATERIAL TO PLATED SUBSTRATES

BACKGROUND OF THE INVENTION

This application is a division of patent application Ser. No. 07/348,045 filed May 5, 1989.

Conventional automotive brake systems operate to stop a vehicle by having brake shoes engage steel brake drums or disc brake pads engage rotors mounted on the axles or wheels of vehicles. During the braking process the brake shoes and disc brake pads are subjected to high temperatures and to high mechanical stresses tending to shear the friction material from the brake shoe or brake pad back plate. In order to resist the high shearing stresses encountered during the braking application friction material has been mechanically affixed to brake shoe and brake pad back plates by rivets, by adhesives and by combinations of rivets and adhesives. A major disadvantage inherent in the use of rivets resides in the fact that by necessity a portion of the rivet must be retained within the friction material thus limiting the amount of friction material available for braking. In the event that the brake shoes or pads are not replaced before the friction material wears to the point that the rivet heads are parallel with the working face of the friction material, the rivets will engage the brake drum or rotor working surface and cause grooves to be formed therein. Accordingly, riveted brake shoes and brake pads generally have been replaced by bonded brake shoes and brake pads for automotive use. An exception to this would be brake shoes and brake pads utilized in heavy trucks, buses or other large vehicles.

In bonded brake shoes and brake pads an adhesive is utilized to bond the friction material to the steel back plate for the brake shoe or the disc brake pad. In conventional processes for bonding friction material to steel back plates care must be taken to ensure that adequate adhesive bond strength is attained. Of crucial importance to achieving a satisfactory adhesive bond is the removal of any impurities such as grease, corrosion, dirt etc. on the bonding surface of the back plate. Conventional processes for bonding friction material subject the steel brake shoe or brake pad back plates to a degreasing process and thereafter to a shot blasting process to ensure that the bonding surfaces of these elements are completely free of any impurities.

One problem inherent in the use of a degreasing process resides in the fact that such a process requires the use of solvents which are environmentally undesirable. These solvents must be handled with care and must be disposed of in a safe manner. Some solvents may be incinerated and such disposal may be quite expensive. In a conventional shot blasting process, the entire back plate for the brake shoes or the brake pads are placed in a machine which tumbles the back plates in a grit until they are clean. During this tumbling process, some of the back plates become twisted or bent which renders them unsuitable for bonding friction material. These back plates must be scrapped. Additionally, it has been found necessary to paint the exposed portions of the metal back plates subsequent to the bonding process to prevent corrosion. Thereafter a lubricant must be applied to the back plate to impart a degree of lubricity to critical wear points on the back plates. These wear points are places where the back plates engage, pivot or slide on some other brake components.

It has been found desirable to provide a process for bonding friction material to back plates for brake shoes or brake pads which do not have to be subjected to a conventional degreasing process, do not have to be subjected to a tumbling type shot blasting process and do not have to be painted or lubricated subsequent to the bonding process and which provides a superior bond to enable the shoes and pad to be utilized on heavier equipment than theretofore possible.

SUMMARY OF THE INVENTION

The present invention provides a process for bonding friction material to a back plate for a brake shoe or brake pad in which the back plate is zinc plated and the friction material is bonded directly thereto.

DESCRIPTION OF THE PREFERRED EMBODIMENT

Figure 1:
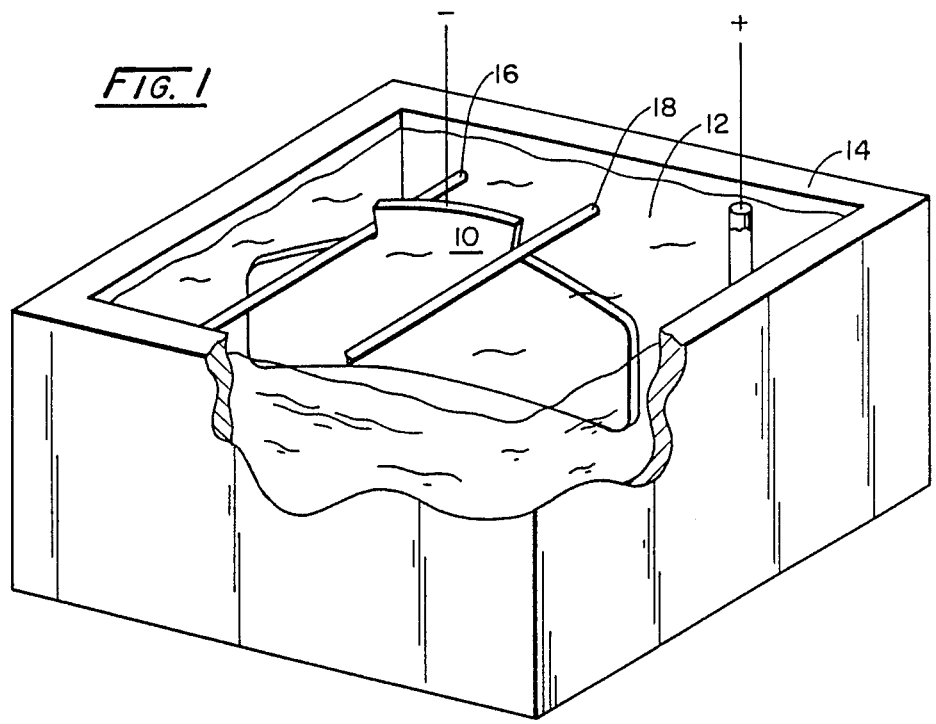
FIG. 1 illustrates a back plate being subjected to an electrolytic process for zinc plating the surface thereof.

The following description describes the process for manufacturing a disc brake pad. The identical process may be utilized to manufacture a brake shoe. Only the shape of the back plate and the shape of the friction material differ between these two elements. Turning to FIG. 1, a back plate (10) suitable for use in the manufacture of a disc brake pad is shown being subjected to an electrolytic zinc depositing or plating process. Such a process may be anodic or cathodic depending upon whether the back plate has been connected directly to the anode or cathode of the device. In the embodiment depicted in FIG. 1 the zinc plating solution (12) resides in a suitable container (14) which may be lead or some other suitable inert material. The back plate (10) has been suspended within the solution by being mounted between a pair of electrodes (16 and 18) connected to the cathode of the device. Subsequent to being submerged within the zinc plating solution and subjected to the electrolysis process, the back plate (10) emerges from the tank (14) with a uniform coating of zinc on its entire exterior surface. The zinc coating provides a clean corrosion resistant surface to which a friction material may be bonded satisfactorily. Additionally, the zinc plating acts as a lubricant on parts of the back plate subjected to wear when the brake pad moves within a brake caliper or a brake shoe moves within a brake drum. Because of its superior resistance to corrosion, the zinc plating obviates the need to paint the back plate subsequent to the bonding of friction material thereon. Additionally, the zinc plating has superior heat resistance over a conventional painted coating on the back plate such that the plating remains intact despite being subjected to the elevated temperatures encountered during the braking process.

Figure 2:
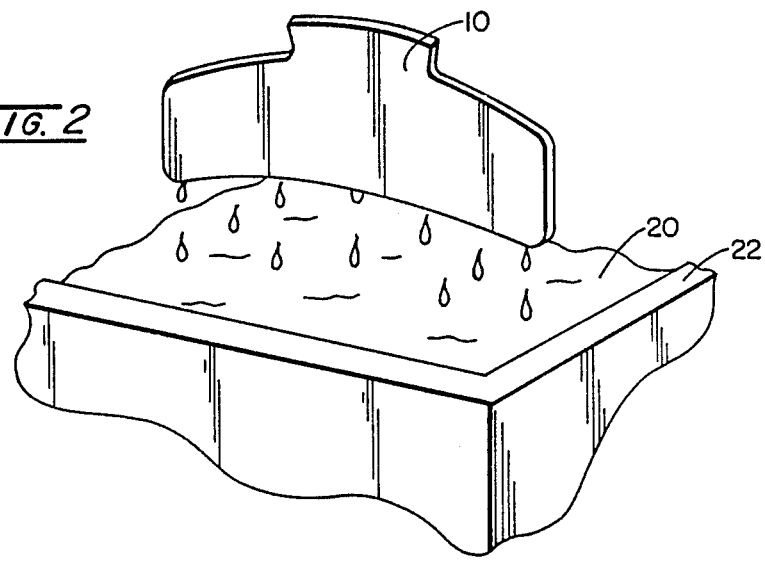
FIG. 2 illustrates a back plate being dipped in a dichromate solution.

Despite the superior corrosion resistance of the back plate (10) achieved by zinc plating, in some applications where the brake pads or shoes may be subjected to an extremely corrosive atmosphere it becomes advantageous to provide the back plate with additional corrosion protection. Turning to FIG. 2, additional corrosion resistance for the back plate (10) may be achieved by dipping the back plate in a liquid dichromate solution (20) which resides at room temperature within a container (22). It has been found that the supplemental dichromate coating provides approximately ten to fifteen percent additional corrosion resistance over the zinc plate coating alone for very little additional cost. Typically only back plates destined for use in vehicles which are operated in a corrosive atmosphere such as those vehicles used on roads treated with chloride salts to dissolve ice and snow would be dipped in a dichromate solution. The dichromate solution also acts as a lubricant on the portions of the back plate which contact or slide on other brake assembly components during the braking operation.

Figure 4:
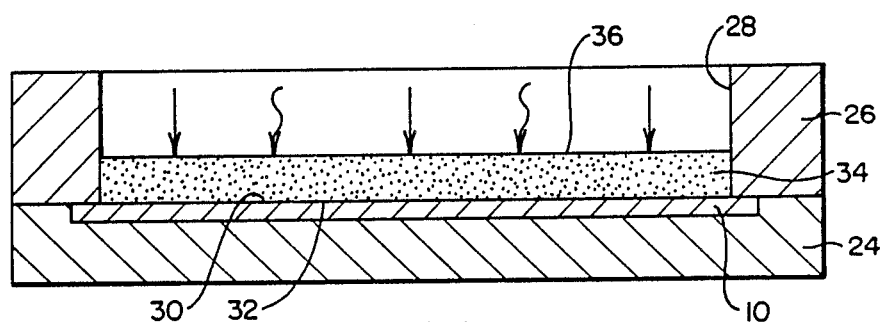
FIG. 4 illustrates a back plate to which a friction material has been adhesively affixed which friction material is being subjected to a combination of heat and pressure.

It has been found that friction material may be bonded directly to zinc plated back plates without subjecting these plates to any additional degreasing, shot blasting or cleaning operations. Thus, subsequent to zinc plating, the back plate (10) is inserted into the lower member (24) of a mold as depicted in FIG. 4. Thereafter an upper member (26) of the mold having a cavity (28) defining the shape of a friction material perform adapted to be bonded to the back plate is lowered onto the lower member (24) to capture the back plate (10) between the lower and upper members (24 and 26). Subsequently, an adhesive is applied to the top surface (30) of the back plate (10) and/or to the bottom surface of a friction material preform (34) and that preform is placed within the cavity (28) of upper member (26). Finally, a combination of heat and pressure are applied to the top surface (36) of the preform (34) to compact the preform and to cure the adhesive interposed between the perform and the back plate to cause a complete bonding of the preform (34) to the back plate (10).

Figure 5:
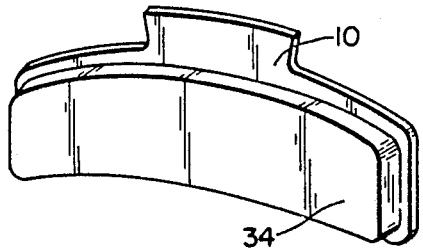
FIG. 5 depicts a finished disc brake pad.

Thereafter the brake shoe or brake pad having a back plate (10) and a friction material preform (34) bonded thereto are removed from the mold as a finished product such as may be seen by referring to FIG. 5. It should be noted that the term preform applies to friction material utilized in disc brake pads and to the friction material commonly referred to as segments in drum type brake shoes.

Figure 3:
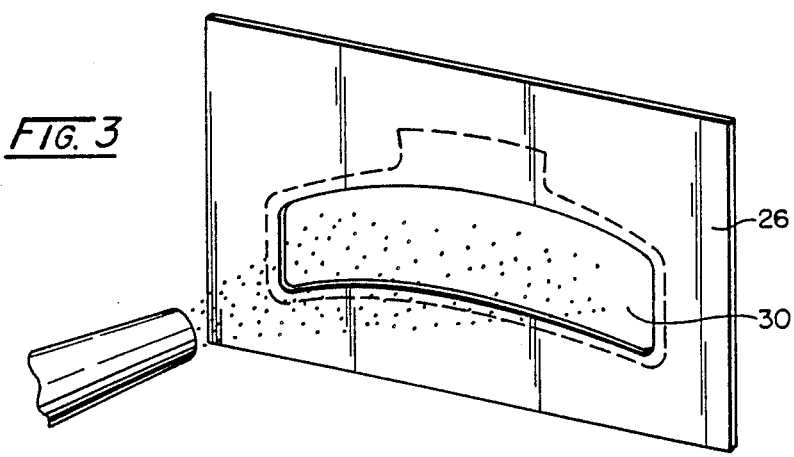
FIG 3 illustrates a back plate placed in a fixture to cover all but the area to which an adhesive is to be applied which area is being subjected to a shot blasting operation.

It has been found that although the friction material preform may be bonded directly to the zinc plated surface of the back plate (10), the preform cannot be bonded successfully to the back plate (10) when it has been given the supplemental dichromate coating. When a back plate (10) has been coated with dichromate an additional step is required in the process of bonding the friction material preform to the back plate. Accordingly, after the back plate (10) has been inserted into the mold and the upper member (26) has been lowered against the lower member (24) to sandwich the back plate (10) therebetween, the top surface (30) of the back plate (10) to which the friction material preform (34) is to be bonded is subjected to a shot blasting operation to remove the dichromate coating (but not the zinc coating) from this portion of the back plate (10) as illustrated in FIG. 3. As may be seen, this shot blasting occurs over a small controlled area with the back plate (10) confined within the mold. Thus, whereas back plates previously were shot blasted by subjecting the entire plate to a tumbling operation, the subject process requires only that a controlled area (the top surface (30)) of the back plate be subjected to a spray type of shot blasting operation. The spray type of shot blasting does not cause any warpage or bending of the back plate (10) and very quickly renders the back plate suitable for bonding the friction material preform (34) thereto.

Subsequent to the shot blasting operation, the back plate (10) which has been coated with dichromate is bonded to a friction material preform (34) in the same manner as a back plate which has been plated with zinc but not coated with dichromate. Thus, subsequent to shot blasting, an adhesive would be applied to the top surface (30) of the back plate (10) and/or to the bottom surface (32) of a friction material preform (34) and the preform inserted within the cavity (28) of upper mold member (26). Thereafter an appropriate combination of heat and pressure would be applied to the top surface (36) of the friction material preform to achieve the appropriate final configuration for the preform (34) and to cure the adhesive to provide an adequate bond between the preform and the back plate.

From the above, it may be seen that the process of the subject invention in which a back plate is zinc plated enables a friction material preform to be bonded directly to the zinc plated surface of the back plate without further degreasing, cleaning or processing and provides a brake shoe or pad having an improved bond with a friction material preform and superior corrosion resistance with less manufacturing cost than encountered in the manufacture of a conventional brake shoe or pad which lacks a zinc plated back plate.

Since certain changes may be made to the above-described structure and method without departing from the scope of the invention herein it is intended that all matter contained in the description thereof or shown in the accompanying drawings shall be interpreted as illustrative and not in a limiting sense.

I claim:

1. A vehicle brake shoe comprising a back plate having a zinc plate coating and a friction material preform in which the bottom surface of the preform engages the top surface of the back plate and an adhesive interposed between the bottom surface of the friction material preform and the top plated surface of the back plate which has been cured by a combination of heat and pressure to obtain an adequate strength bond of the preform to the back plate.

2. The vehicle brake shoe of claim 1, in which said brake shoe is a disc brake pad for use in a disc brake assembly.

3. A vehicle brake shoe comprising a back plate having a coating of zinc plate and a layer of dichromate overlying the coating of zinc plate except for the portion of the top surface of the back plate which engage a friction material preform and a friction material preform having a bottom surface which is bonded to the zinc plated top surface of the back plate by an adhesive which has been cured by the application of heat and pressure to the brake shoe to provide a bond of adequate strength between the back plate and the friction material preform.

4. The vehicle brake shoe of claim 3, in which said brake shoe is a disc brake pad for use in a disc brake assembly.

* * * * *